(12) United States Patent
Hethuin

(10) Patent No.: US 6,255,982 B1
(45) Date of Patent: Jul. 3, 2001

(54) METHOD OF CHARACTERIZATION OF AN OVERFLOWN GROUND FROM A FM/CW RADIO ALTIMETER SIGNAL

(75) Inventor: Serge Hethuin, St. Remy les Chevreuses (FR)

(73) Assignee: Thomson TRT Defense, Guyancourt (FR)

( * ) Notice: Subject to any disclaimer, the term of this patent is extended or adjusted under 35 U.S.C. 154(b) by 0 days.

(21) Appl. No.: 07/789,371

(22) Filed: Oct. 28, 1991

(30) Foreign Application Priority Data

Dec. 12, 1990 (FR) .................................................. 90 15551

(51) Int. Cl.⁷ ...................................................... G01S 13/32
(52) U.S. Cl. ............................................. 342/122; 342/192
(58) Field of Search ............................... 342/90, 122, 192

(56) References Cited

U.S. PATENT DOCUMENTS

| | | | |
|---|---|---|---|
| 3,213,451 | * 10/1965 | Alpers | 342/121 |
| 3,344,419 | * 9/1967 | Lund | 342/190 |
| 4,161,731 | * 7/1979 | Barr | 342/22 |
| 4,185,285 | * 1/1980 | Bose | 342/159 |
| 4,620,192 | * 10/1986 | Collins | 342/128 |
| 4,766,436 | * 8/1988 | Crepin et al. | 342/122 |

\* cited by examiner

Primary Examiner—John B. Sotomayor
(74) Attorney, Agent, or Firm—Oblon, Spivak, McClelland, Maier & Neustadt, P.C.

(57) ABSTRACT

The invention proposes a novel method for using the signals provided by an airborne FM/CW radio altimeter, allowing to perform an analysis of the ground overflown by an aircraft for the purpose of, for example, identifying it, or alternatively of recognizing it. The method of the invention consists in analyzing, in the frequency domain, the shape of the spectrum of the beat signal generated by said radio altimeter to characterize said ground so as to extract from it information relating to the reflectivity of said ground.

11 Claims, 4 Drawing Sheets

METHOD OF CHARACTERIZATION OF AN OVERFLOWN GROUND FROM A FM/CW RADIO ALTIMETER SIGNAL

BACKGROUND OF THE INVENTION

DISCUSSION OF BACKGROUND

The present invention relates to the field of navigation aids for aircraft.

More specifically, the present invention proposes a novel method for utilizing the signals provided by an airborne radio altimeter of the FM/CW type, which are generated when an aircraft flies over a ground area which is to be analyzed.

FM/CW radio altimeters have traditional applications in the field of altimetry. They are transceivers whose carrier wave is transmitted at a frequency of, for example, a few gigahertz to a few tens of GHz and which is cyclically modulated by a frequency-modulated signal. The measurement of the frequency of the beat between the transmitted and received waves provides directly an information representative of the distance separating the transceiver from the obstacle having reflected the signal.

Traditionally, the processing of the beat signal from FM/CW radio altimeters has been performed by analog circuitry.

Now, the power density of the beat signal produced by such a system exhibits a more or less spread frequency spectrum 11, as schematically shown in FIG. 1. But, in fact, for the height measurement performed in conventional altimetry, only a small portion of the spectrum is useful and consequently used (for example, in the simple case where the attitude of the airplane is parallel to the ground, and in the absence of Doppler shift, it is the beat frequency $f_O$ corresponding to the point 10 of maximum value $A_m$ of power density A which is directly proportional to the height of the aircraft above ground).

As a consequence, in conventional altimetry with analog processing, the beat signal is very highly filtered so as to eliminate the non-utilized portions of the spectrum, in particular in the decay region 13.

SUMMARY OF THE INVENTION

An object of the present invention is to utilize all of the information contained in the power density spectrum of the beat signal by assuming that this spectrum is also representative of the nature of the overflown ground. As a matter of fact, the power density spectrum depends on the reflectivity characteristics of the ground returning the signal.

More specifically, a first object of the present invention is to use a FM/CW radio altimeter to perform the identification of the overflown ground with reference to a few standard types previously cataloged.

Another object of the present invention is to provide such a method allowing the recognition of outstanding elements of the ground, in particular outstanding lines, such as water areas, roads, railways, buildings, forests, high-voltage power lines, etc. This makes possible, for example, re-alignment operations in navigation by correlation with a stored map, or "map-matching guidance", even in the absence of relief.

A supplementary object of the present invention is to provide such a method giving information about the condition of the overflown ground, for example the determination of the state of sea (which affects its reflectivity) in order to infer from it the optimum flying altitude of an aircraft. More generally, an object of the method according to the present invention is to provide aircraft guidance information while furnishing decision elements for navigation (for example, a system of the type with a Kalman filter).

These objects, as well as others which will become apparent later, are achieved by means of a method of characterization of an overflown ground, in particular to recognize a predetermined type of ground, or outstanding transitions or sequences of transitions on said ground, consisting in transmitting in the direction of the ground a signal by means of a radio altimeter of the FM/CW type, and in analyzing, in the frequency domain, the shape of the spectrum of the beat signal generated by said radio altimeter to characterize said ground. According to the present invention, the method consists in extracting from the shape of the spectrum of said beat signal information relating to the reflectivity of said ground.

Preferably, the present invention consists in generating a quantity representative of the reflectivity of the overflown ground from at least one of the two following measurements:

- measurement of the amplitude of the spectrum of the beat signal, as being representative of the reflectivity of the ground straight under the aircraft;
- measurement of the frequency spreading (inverse of the range above threshold of the spectrum of the beat signal, as being representative of the backscatter diagram of the overflown ground.

Advantageously, the reference values are first generated so as to categorize spectra of the beat signal in accordance with at least three categories of ground:

- specular ground;
- averagely scattering ground;
- higly scattering ground.

In an advantageous embodiment of the present invention, the method consists in generating a signature of the overflown ground, for one thing, from said reflectivity information and, for another thing, from the information of height above ground provided by the radio altimeter;

The method of the invention allows also to use as a criterion for the recognition of the spectrum of the beat signal a model of the decay of said spectrum.

In this case, the model of the slope of the beat signal spectrum is advantageously implemented by means of a function of the type:

$$y=1/u^{2N-1},$$

where:
- p: antenna lobe index
- q: ground backscatter index
- N=p+q+2
- u=f/$f_O$ (beat frequency r reduced by the reference frequency $f_O$ corresponding to a reflection normal to the ground, in the absence of Doppler shift:

$$f_O=2(h_O/c)\ (F/T).$$

The coefficient N derived from the model gives then a value representative of q that can be multiplied with the measures of amplitude and spectrum spreading to form a composite coefficient of signature analysis.

Recognition of the shape of the beat signal spectrum may also take into account at least one of the following criteria:
- maximum amplitude of the main peak of the spectrum;
- measurement of contrast (maximum amplitude/average amplitude);

steepnes of the spectrum leading edge;

number of secondary peaks.

For analyzing the beat signal spectrum, it is also advantageous to weight the recognition criteria of the beat signal spectrum with at least one of the following additional criteria:

attitude of the aircraft;

Doppler shift due to the velocity relative to ground;

radiation pattern of the radio altimeter antenna.

According to the present invention, the characterization may also be peformed by taking into account the time-related fluctuations of the spectrum of the beat signal.

In a further embodiment of the present invention, the recognition of said ground is performed by combining the information extracted from two beat signal spectra from two radio altimeters operating in different frequency bands.

BRIEF DESCRIPTION OF THE DRAWING

Other features and advantages of the present invention will become apparent from the following detailed description of preferred embodiments given as a non-limitative example with reference to the accompanying drawings, in which.

DESCRIPTION OF THE PREFERRED EMBODIMENTS

Figure 2:
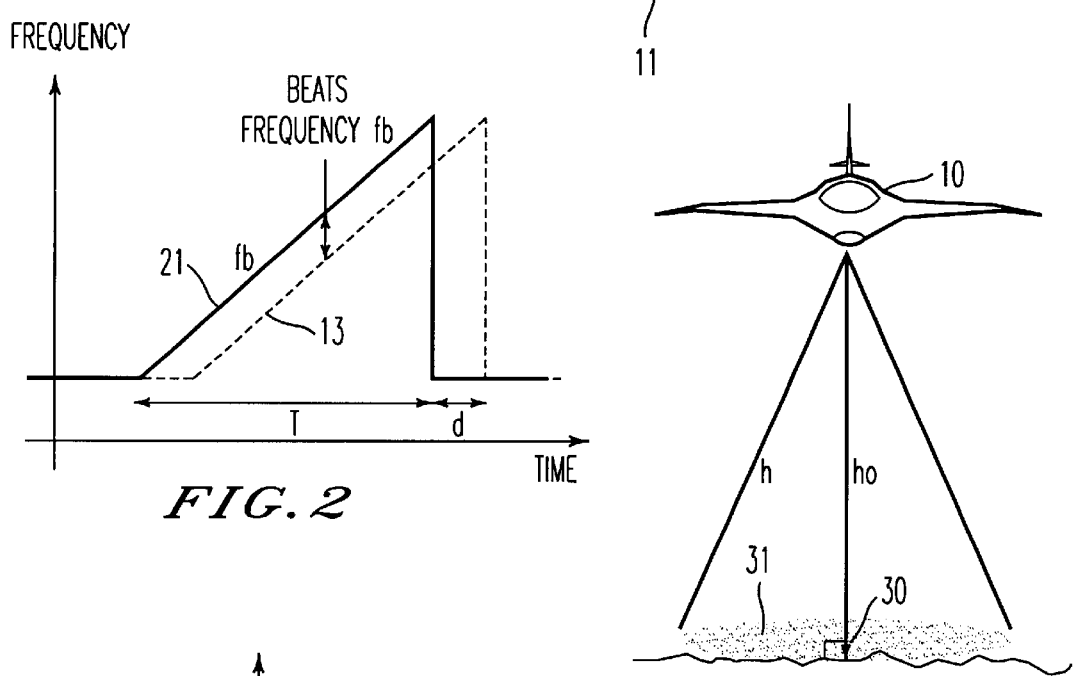
FIG. 2 shows the sawtooth, or ramp, signal linearly modulating the microwave of a FM/CW radio altimeter, so as to illustrate the manner in which the beat signal is produced.

FM/CW radio altimeter operate in accordance with the principle illustrated in FIG. 2. A microwave, linearly frequency-modulated by a sawtooth signal 21, is transmitted toward ground. The receiver, of the homodyne type, receives the wave 22 reflected by the ground and mixes it with the transmitted wave.

Figure 3:
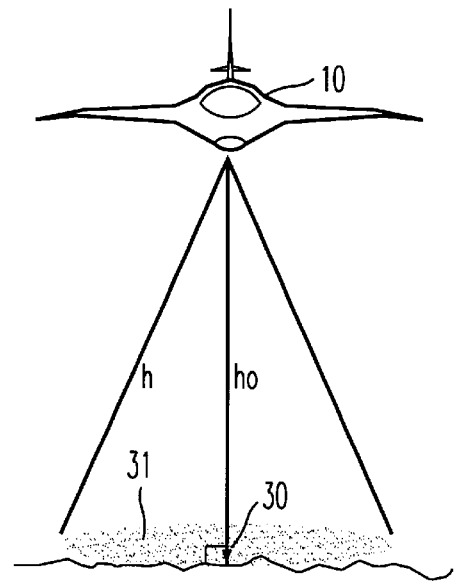
FIG. 3 illustrates schematically the principle of ground sensing by a FM/CW radio altimeter mounted in an airplane, from which the method of the invention is implemented.

The beat frequency which results from a reflection on a point 31 of the ground located at a distance h from the aircraft (see FIG. 3) is (for a zero Doppler shift):

$$f_O = \tau \Delta F / T,$$

where:

$\Delta F$: beat frequency ($f_b$);

T: period of the sawtooth signal;

$\tau = 2h/c$;

c: velocity of light.

Figure 1:
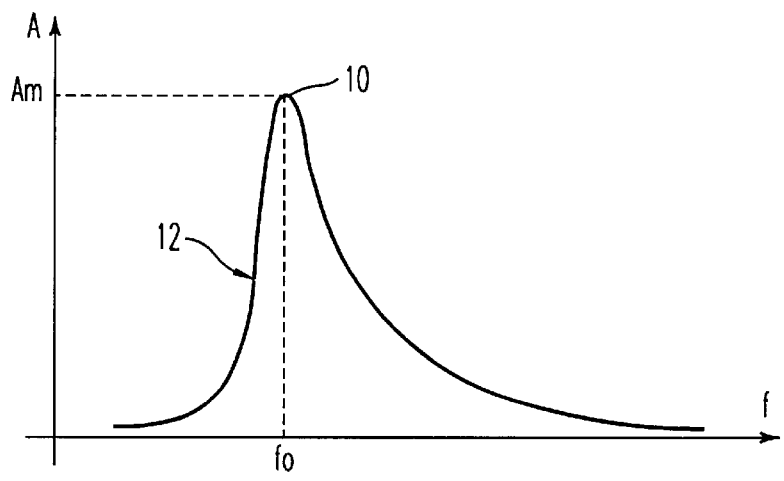
FIG. 1 is a diagrammatic representation of the beat signal spectrum as obtained by a radio altimeter of the FM/CW type.

The beat signal obtained for all of the reflections from the ground and received within the antenna lobe is composed of a set of sinusoidal components with various amplitudes. The envelope 11 of the spectrum of a beat signal is shown, for example, in FIG. 1.

The value of the minimum height $h_O$ of the aircraft 32 above the ground 30 is then derived from the digital spectral analysis of the beat signal. The spectra of the beat signal are, for example, obtained at an average rate of 250 per second and are composed of about 250 elemental lines of width equal to 500 Hz.

The height extraction criteria are mainly based on the detection of the leading edge (FIG. 1) of the spectral distribution, which corresponds on a flat ground and in the absence of roll and pitch, to the height $h_O$ along the vertical from the aircraft. In this type of operation, the spectral signature 11 is not fully utilized.

According to the present invention, the recognition of the nature of the overflown ground and in particular of its reflectivity involves using more completely the spectral signature being obtained.

Figure 9:
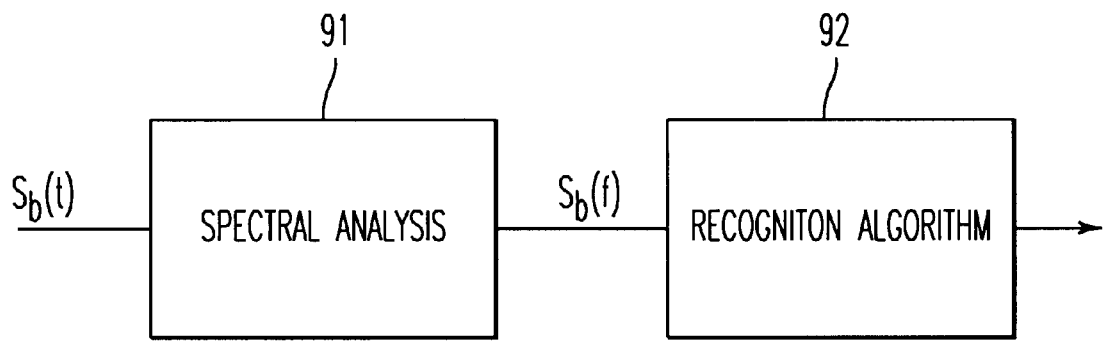
FIG. 9 is a schematic representation of the two essential steps of the method of the invention: spectral analysis, then implementation of pattern recognition analysis.

More specifically and as shown in FIG. 9, the implementation of ground recognition takes advantagegeously place in two phases:

spectral analysis 91 of the beat signal $S_b(t)$; and application of algorithms 92 of recognition of the spectral signature $S_b(f)$.

The spectral analysis may be implemented:

either through the conventional method as, for example, the "correlogram" (frequency transformation of the signal after averaging so as to minimize the effect of noise). It is the application of this method leading to the obtention of a spectral analysis which is described in detail in the following paragraphs;

or by a parametric method based, for example, on the linear prediction; in this case, a set of p coefficients of linear prediction is generated (p is the order of mobilization) by means of which it is possible to characterize the overflown ground without using the spectrum.

The recognition algorithms may be:

either characterization methods based on the shape of the spectrum (as detailed below with reference in particular to FIGS. 7 and 8)

or a recognition method without characterization. Such a method implies to use, for example, a monitored neural network: learning by the system is implemented by injecting strictly identified beat signals (sea, road, path, forest, etc. signals) and the system can then detect any new xcitation by itself.

A homogeneous ground is characterized by its reflectivity $\sigma(\theta)$, which is a function of the illumination angle ($\theta$), and is equal to $\sigma_O \sigma'(\theta)$, where $\sigma_O$ is the reflectivity of the ground straight under the aircraft, and $\sigma'(\theta)$ corresponds to the backscatter diagram. It is classically considered that $\sigma'(\theta) = \cos^{2q}(\theta)$, where q characterizes the backscatter diagram (model of Mulhemann).

The values of the parameters $\sigma_O$ and q are closely related to the specularity of the surface: if $\sigma_O$ is high, then q is significant; similarly, if $\sigma_O$ is low, then q is low. By way of example, there are as extremes the forest with q=2 (highly scattering ground) and a smooth sea with q=32. A recognition criterion can then be formed by multiplying the values of q and $\sigma_O$. The problem consists in characterizing the type of overflown ground and in particular the values of the parameters $\sigma_O$ and q of this ground through the spectral signature received by the radio altimeter.

Figures 4A, 4B:
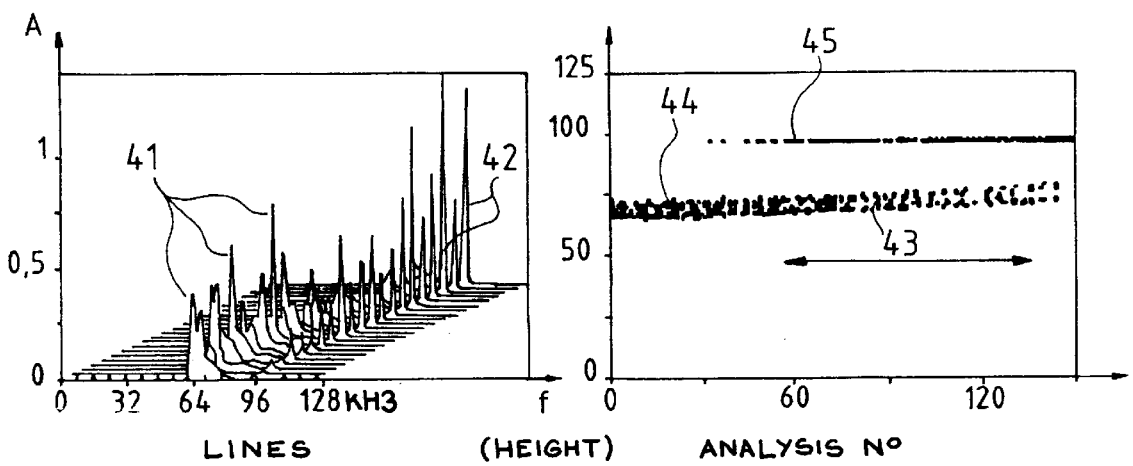
FIGS. 4A, 4B respectively show the successive spectra (FIG. 4a) and their representation with a binary amplitude (FIG. B) plotted using a FM/CW radio altimeter aboard an airplane flying over a cliff edge in the land-to-sea direction.

This is illustrated by FIGS. 4A and 4B which graphically reproduce the measurements obtained corresponding to the overflight of an airplane equipped with a FM/CW radio altimeter at the vertical of a cliff edge in the land-(scattering ground) to-sea (specular surface) direction.

FIG. 4A shows the successive spectra obtained every 22 ms in which there can be seen plotted as abscissa (frequency, thus distance, axis) the little energetic but very extended signature 41 of the cliff centered on 64 kHz, and the highly energetic and narrow response 42 of the sea centered on 96 kHz. The difference between the frequencies 64 kHz and 96 kHz is representative of the difference of level from the sea to the cliff and consequently of the difference of height of the airplane with respect to the two overflown "grounds".

FIG. 4B shows the same scenario with time plotted as abscissa, frequency as ordinate and binary-represented amplitude after thresholding of the signals in FIG. 4A, thus producing a black-and-white image. Each spectrum thus corresponds to a vertical column as seen from above. One can notice the difference of spectral range and time-related fluctuations which are characteristic of the two grounds and allow to identify the transition from one type of ground to the other. The land signal trace 44 extends into what is labelled 43 in FIG. 4b. This extensions 43 of the trace of the land signal occurs despite the fact that the sea signal 45 indicates that the airplane is already flying over the sea. This characteristic is due to the "skew" phenomenon resulting from the reflection effect of the edge of cliff above the sea.

It should be noted that in the case of a smooth reflective ground, the power received by the radio altimeter depends practically no longer on the ground since it is assumed that all the reflected energy comes from an image point of the transmitter on the ground. There is then defined an equivalent reflectivity $\sigma_s = G_r/4$, where G is the antenna gain and r is the reflection coefficient of the ground. This explains why with a pencil-beam, hence high-gain, antenna, the dynamic range of the amplitude of the received echoes is significant.

According to an important feature of the present invention, the proposed method of characterization of an (homogeneous) overflown ground allows to extract the reflectivity coefficients ($\sigma_O$, q) of the ground from the spectral density of the beat signal obtained in the presence of a Doppler shift.

It can be shown that the center of the power spectral density of the beat signal effectively provides a measure or a trend of the coefficients $\sigma_O$ and q.

More specifically, it can be shown that the set of points on the ground contributing to give energy at a frequency of the spectrum (referred to as "isofrequency") approximates a circle with the equation $h^2 = a + b \cos \chi$
where $a = r^2 + h_O^2 + h_O^2 \alpha^2 \cos^2$ and $b = 2rh_O\alpha\cos\delta$ whose center and radius are determined by the parameters:
  $\alpha$ (normalized Doppler shift): $\alpha = 2V_R/\lambda h_O$
    where $V_R$: relative velocity between the airplane and the reflecting point; and
  $f_O$: beat frequency due to the path along the vertical in the absence of Doppler shift along the vertical;
  $\lambda$: wavelength being used;
  $\delta$: tilt angle of the velocity vector relative to the hozontal.

The various isofrequencies thus form a family of concentric circles.

The power spectral density S(u) at the reduced fequency $u = f/f_O$ is obtained by integrating the power reflected by each surface element of the isofrequency u while taking into account the antenna radiation pattern and the change in reflectivity of the ground with the incidence angle.

Two cases can be considered:
  $\alpha$ is small, which corresponds to the case where the beat frequency $f_O$ is significant and/or the wavelength is long (or alternatively the velocity of the aircraft is low). In this case, it can be shown that $S(u) = \sigma_O/2(1/u^{2N-1})$; the spectral density exhibits a maximum for $u_{min}$ (value of the minimum of the normalized beat frequency). The decrease of S(u) when u increases substanlially depends on the reflectivity coefficient q of the ground for a given antenna. The greater the ground scattering (low q), the more spreadout is the spectrum. Furthermore, the power spectral density is directly proportional to $\sigma_O$;
  $\alpha$ is close to 1, which corresponds to the case where the beat frequency $f_O$ is low and/or the wavelength is short. In this case, the computation is more complex and the signature is the more rich as the antenna lobe is significant and the ground is scattering. As a matter of fact, it can be shown that the trend of the power spectral density S(u) is given by:

$$S(u) = \beta_0/2(N-1) \sum_{k=0,(N/2-1)} c_{N-1}^{2k+1}(2\alpha)^{2k}(u^{2N-2k-3})/(u^4+4\alpha^2)^{N-1}$$

where N=p+q+2.

In spite of the interference of other parameters the power spectral density remains proportional to $\sigma_O$ and its decrease is related to the reflectivity q of the ground. The shape of the spectrum depends in addition on the horizontal velocity $V_r$ (in $\alpha$).

The principle of the present invention consists in constructing a ground reflectivity index representative of the characteristic coefficients $\sigma_O$ and q of the ground. The complexity of the problem is the consequence of the difficulty in determining the theoretical shape of the spectrum to be obtained, the interaction of parameters independent of the ground such as the antenna lobe, the influence of the aircraft attitude and velocity vector, and the effect of the relief of the ground.

The identification of the type of ground is based more particularly on the point-type measurement of a quantity representative of the average backscatter coefficient of the ground (index of the ground). This coefficient may consequently be averaged or more generally filtered in accordance with a transfer function of the low-pass type. The ground index is derived from each of the instantaneous spectra of the beat signal through a method of characterization of the spectrum more largely associated with pattern recognition.

The tests performed show to indicate to show that the discrimination obtained between a ground with scattering characteristics and a ground which is basically smoothed (slight ground scattering) is clear and without overlap. An optimization based on the effect of each of the measured parameters and leading to the weighting of each of them in the formula being used, allows to further improve these results.

By extension, the detection of outstanding features or of "special cuts and textures" makes use of the temporal examination of the point-type measurements of the ground index of reflectivity. It is by examining the trend of the successive indices that one may attempt to identify said "cuts" in the ground (passage from a scattering area to a specular area or conversely, for example) and furthermore to recognize the outstanding structures such as passages over rivers, roads, highways, forests, high-voltage power lines, etc, with the help of as many as possible of additional data such as simultaneous changes in the detected height, the derived area lengths, etc.

The characterization criteria of the ground with respect to the shape of the spectrum of the beat signal may in particular be the following:

qualitative ground identification tests. The reflectivity index used is simply constructed as the product of the maximum amplitude of the spectrum by the inverse of the range of the spectral signature above a particular threshold. This index is thus proportional to $\sigma_O$ and related to q. It is particularly useful for the detection of passage over areas with various reflectivities;

a direct measurement of $\sigma_O$ can be made, after calibration, by weighting the amplitude of the spectrum with the gain value assigned to the chain of stages handling the FM/CW signal, in particular in the receiving chain (the transmission gain being generally normalized);

taking into account the detected altitude as an additional information for the detection of outstanding areas as, for example, clearing/forest transitions, dams and high-voltage power lines;

study of additional categorizing variables from the theoretical shape of the spectrum to be obtained, even in the case of a high $\alpha$.

Figures 1, 8A:
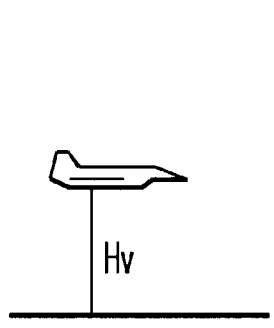
FIGS. 8A, 8D show the theoretical signature obtained for various typical ground configurations.
Figures 2, 8A:
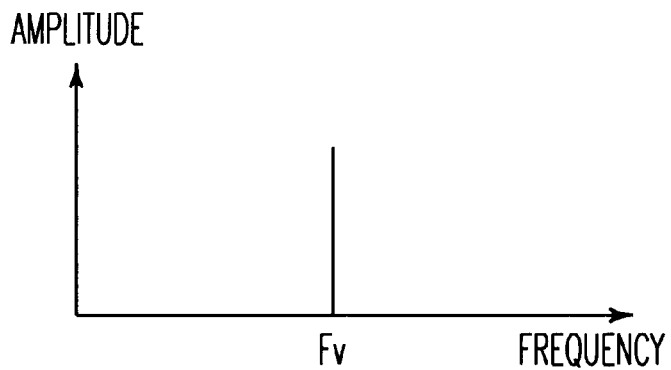
Figures 1, 8B:
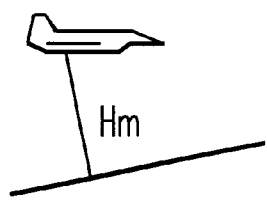
Figures 2, 8B:
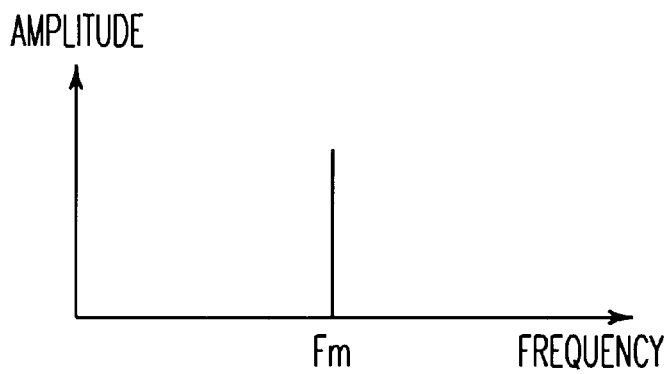
Figures 1, 8C:
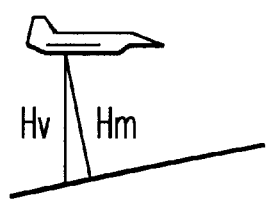
Figures 2, 8C:
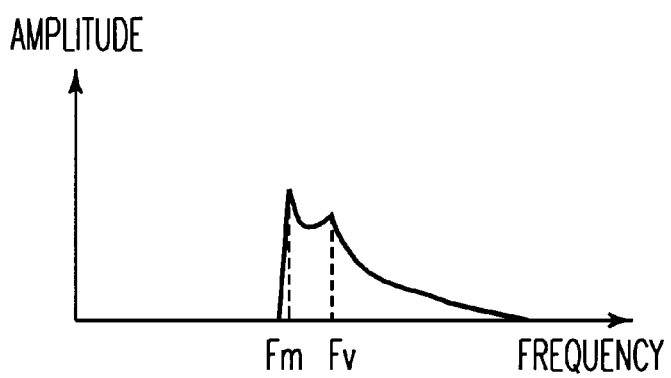
Figures 1, 8D:
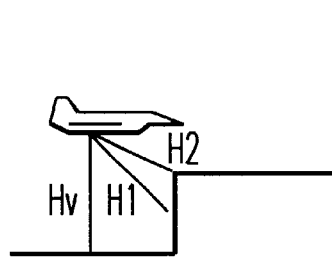
Figures 2, 8D:
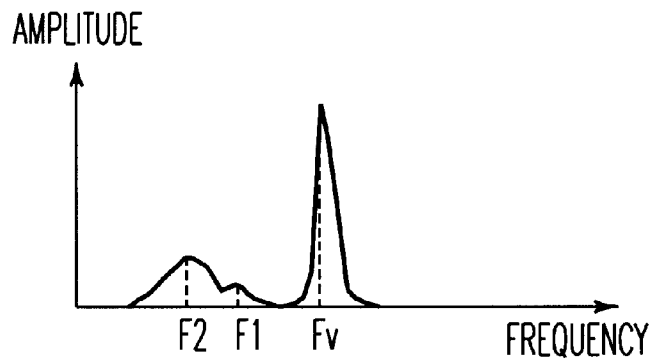

Reference is now made to FIGS. 8A, 8B, 8C, and 8D respectively showing the theoretical signature obtained in the following cases:

specular horizontal plane ground (FIG. 8A);
specular tilted plane ground (FIG. 8B);
scattering tilted plane ground (FIG. 8C);
passage over a step-like feature (FIG. 8D).

Figure 7:
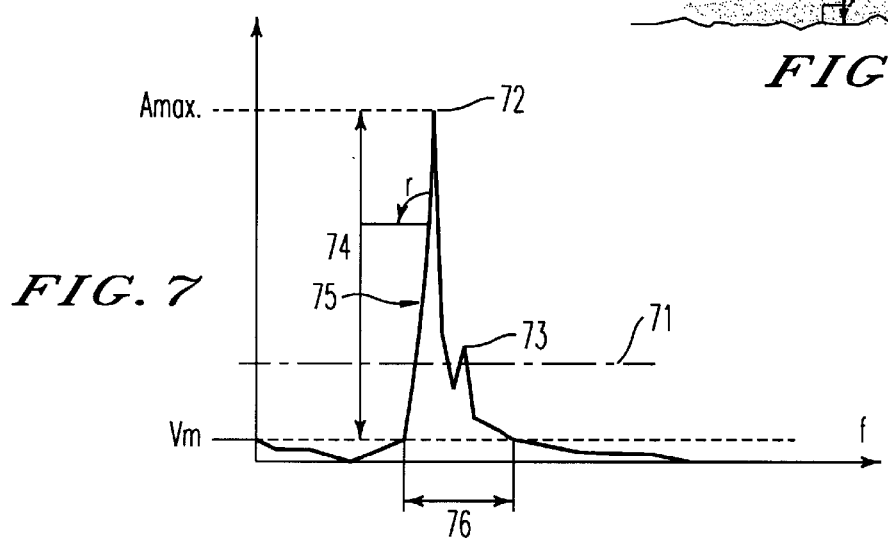
FIG. 7 is a diagram illustrating various signature recognition processings that can be carried out on the spectrum of a beat signal.

As illustrated in FIG. 7 which shows the power spectral density y as a function of frequency, the recognition criteria of the spectrum may go through thresholdings 71, detections of maximums 72, 73, contrast measurements 74 against the maximum amplitude $A_{max}$ and the average value $V_m$, a filtering of the barycenter type, the measurement of the steepness r of the leading edge 75, the range above threshold 76, etc.

A ground is scattering if contrast and steepness are low and range above threshold is significant.

A ground is specular if contrast and steepness are significant and range above threshold is narrow.

taking into account the deterioration caused by the various attitudes of the aircraft;

taking into account the time-related fluctuations of the successive spectra for the additional characterization of the overflown ground (a specular ground generally has a more stable signature). Thus, for example, through the measurement of the standard deviation of the fluctuation of this maximum, it is possible to further improve the reliability of the performed identification.

determining the maximum derivative of the spectrum;

modeling the decay of the spectrum (in particular by a least-square method). As an example, it is possible to model the spectrum, after thresholding, to the form:

$$y=1/u^{2N-1},$$

where:
p: antenna lobe index;
q: ground backscatter diagram index;
N=p+q+2;
$u=f/f_O$ (beat frequency f reduced by the reference frequency $f_O=2(h_O/c)(\Delta F/T)$.

In any case it is preferable to use a high sampling frequency to improve the spectrum recognition.

Figures 5A, 5B:
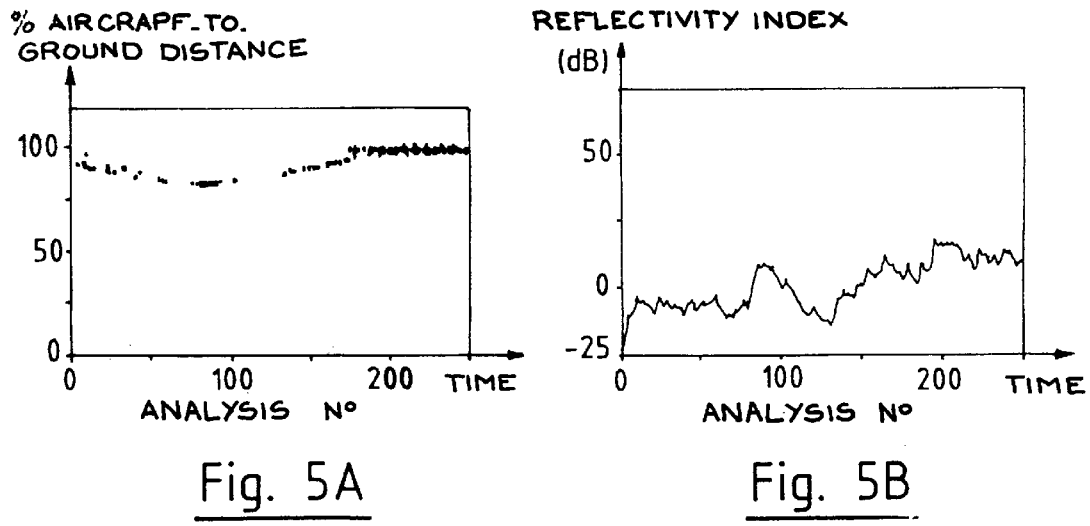
FIGS. 5A, 5B respectively show the height profil and the reflectivity index curve obtained by means of a centimetric FM radio altimeter at 4.3 GHz during a flight over a dam and the associated water.

FIGS. 5A and 5B show the results obtained with a conventional radio altimeter at 4.3 GHz ($\lambda$=6 cm) using a wide-aperture antenna (60° along both axes). The operating wavelength makes $\alpha$ close to zero ($\alpha$=0.1 for $V_{max}$=200 m/s and $f_O$=80 kHz). As a consequence, the shape of the spectrum may be expressed in $1/u^n$.

Referring to FIG. 5A, the height profile obtained when passing over a dam and the associated water. The average flying height is 250 feet. The spacing between any two consecutive spectra is 5 ms and the total sensing time is 1.25 seconds, corresponding to a travel of about one hundred meters. FIG. 5B shows the trend of the reflectivity index previously defined during the successive sensings.

Figures 6A, 6B:
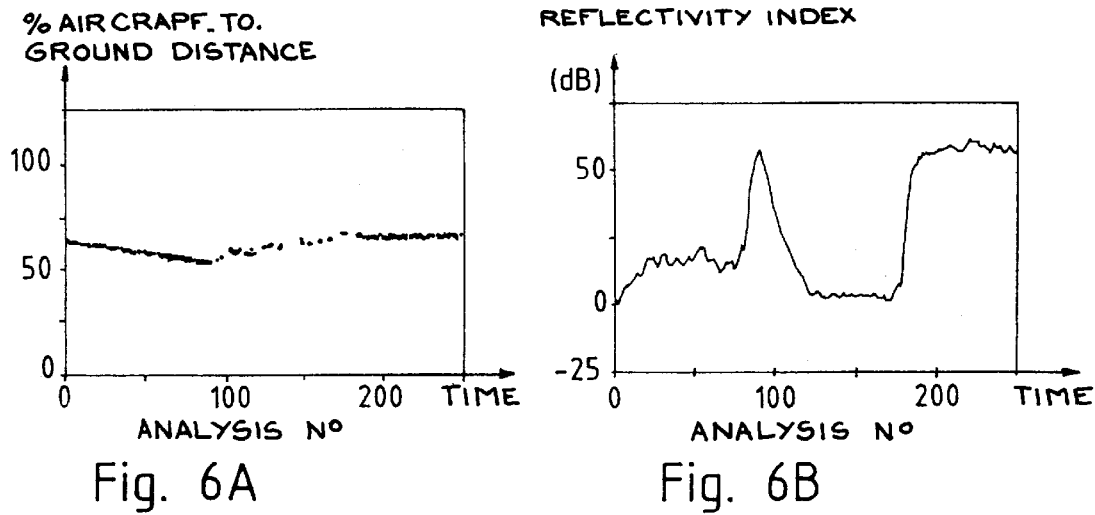
FIGS. 6A, 6B respectively show the height profile and the reflectivity index curve obtained by means of a millimetric FM/CW radio altimeter at 60 GHz when flying over a dam and the associated water.

Referring to FIGS. 6A and 6B, the results obtained with a radio altimeter operating at 60 GHz ($\lambda$=5 mm) with a narrow-beam antenna (5°). The wavelength used here allows $\alpha$ to come close to 1. In the present embodiment, the shape of the spectrum is rather close to that of case N°2 considered above ($\alpha$ close to 1), with a strong effect of the parameter q (narrow antenna lobe).

Referring to FIG. 6A, the height profile obtained for the same ground (simultaneous experiment) at the same height is shown. FIG. 6B shows the reflectivity index and its change with time.

It can be seen that the measurements of the two types of radio altimeters are complementary:

the "centimetric" FM/CW radio altimeter with a wide antenna (FIGS. 5A and 5B) allows a correct measurement of the height whichever the attitude of the aircraft, and does allow the identification of extended scattering areas;

the "millimetric" FM/CW radio altimeter, with a pencil beam (FIGS. 6A, 6B) illuminating a small area on the ground, is more sensitive to the attitude of the aircraft, in particular at wide angles, for the accurate determination of the height. The dynamic range of the spectra is very wide and allows an easy detection of small areas with specular reflection and, due to this, of ground cuts (roads, paths, rivers, railways, high-voltage power lines, etc.).

What is claimed is:

1. A method of characterization of an overflown ground by either recognizing a predetermined type of ground, or outstanding transitions or sequences of transitions on said ground, said method comprising the steps of:

transmitting in the direction of the ground a signal by means of radio altimeter of the FM/CW type, and;

analyzing in the frequency domain a shape of a spectrum of a beat signal generated by said radio altimeter in order to provide said characterization.

2. A method according to claim 1, consisting in extracting from the shape of the spectrum of said beat signal information relating to the reflectivity of said ground.

3. A method according to any one of claims 1 or 2, comprising the step of:

generating a quantity representative of said reflectivity of the overflown ground from at least one of a first and a second measurement wherein said first measurement is a measurement of the amplitude of the spectrum of the beat signal, which represents the reflectivity directly under the aircraft and wherein said second measurement is a measurement of the range of the spectrum of the beat signal, which represents a backscatter diagram of the overflown ground.

4. A method according to one of claims 1 or 2, consisting in generating reference values so as to categorize beat signal spectra in accordance with at least three categories of ground:

smooth reflective ground;

averagely scattering ground;

highly scattering ground.

5. A method according to claim 2, consisting in generating a signature of the overflown ground from, for one thing, said reflectivity information, and for another thing, from the information of height relative to ground provided by the radio altimeter.

6. A method according to any of claims 1 or 2, consisting in using as a criterion of recognition of the spectrum of said beat signal, a model of the decay of said spectrum.

7. A method according to claim 6, wherein said model of the slope of the beat signal is constructed by means of a function of the type:

$$y=1/u^{2N-1},$$

where:

p: antenna lobe index;

q: ground backscatter diagram index;

N=p+q+2;

u=f/f$_O$ (beat frequency f reduced by the reference frequency f$_O$ corresponding to the reflection normal to the ground, in the absence of Doppler shift).

8. A method according to any of claims 1 or 2, wherein the recognition of the shape of the spectrum of saif beat signal takes into account at least one of the following criteria:

maximum amplitude of the main peak of the spectrum;

measurement of contrast (maximum amplitude/average amplitude);

steepness of the leading edge of the spectrum;

number of secondary peaks.

9. A method according to any of claims 1 or 2, wherein said criteria of recognition of the spectrum of the beat signal are weighted by at least one of the following additional criteria:

attitude of the aircraft;

Doppler shift due to the velocity of motion relative to ground;

antenna radiation pattern of the radio altimeter.

10. A method according to any of claims 1 or 2, wherein said characterization of the ground is performed by taking into account the time-related fluctuations of the spectrum of said beat signal.

11. A method according to any of claims 1 or 2, wherein said recognition of the ground is performed by combining the information extracted from two beat signal spectra from two radio altimeters operating in different frequency bands.

* * * * *